United States Patent
Shuster

(10) Patent No.: US 9,596,569 B2
(45) Date of Patent: *Mar. 14, 2017

(54) METHOD AND APPARATUS FOR INTERACTIVE MOBILE OFFER SYSTEM USING TIME LOCATION FOR OUT-OF-HOME DISPLAY SCREENS

(71) Applicant: ACTV8, Inc., Beverly Hills, CA (US)

(72) Inventor: Brian Shuster, Los Angeles, CA (US)

(73) Assignee: ACTV8, INC., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,062

(22) Filed: Jan. 25, 2016

(65) Prior Publication Data

US 2016/0219407 A1 Jul. 28, 2016

Related U.S. Application Data

(63) Continuation of application No. 13/962,908, filed on Aug. 8, 2013, now Pat. No. 9,258,342.

(Continued)

(51) Int. Cl.
*G06F 15/16* (2006.01)
*H04W 4/02* (2009.01)
(Continued)

(52) U.S. Cl.
CPC ......... *H04W 4/023* (2013.01); *H04L 65/4069* (2013.01); *H04L 65/4084* (2013.01); *H04N 21/25841* (2013.01); *H04N 21/4122* (2013.01); *H04N 21/4126* (2013.01); *H04N 21/4307* (2013.01); *H04N 21/4394* (2013.01); *H04N 21/4524* (2013.01); *H04N 21/4622* (2013.01); *H04N 21/812* (2013.01); *H04N 21/8133* (2013.01); *H04W 4/021* (2013.01); *H04W 4/026* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 7,546,254 B2 * | 6/2009 | Bednarek | G06Q 30/0201 705/26.1 |
| 2009/0012841 A1 * | 1/2009 | Saft | G06Q 30/02 705/7.29 |

(Continued)

*Primary Examiner* — Peling Shaw
(74) *Attorney, Agent, or Firm* — Blakely Sokoloff Taylor & Zafman LLP

(57) ABSTRACT

Content which is related to content being displayed on an out-of-home display screen is synchronized with content being shown on an out-of-home display screen. A mobile device operates to receive content which is related to the content being displayed on the out-of-home display screen. The system operates based on mobile device location, out-of-home display screen location and the time of day. Based on the time and locations, a server can determine what content is on the display screen and can therefore serve related content based on that to the mobile device. It works passively with periodic regular updates of the mobile device location or actively through the use of a button (touch screen, keyboard, etc.) on the mobile device to signal the server to check its location and therefore identifying which display screen the mobile device is near.

17 Claims, 2 Drawing Sheets

Related U.S. Application Data

(60) Provisional application No. 61/681,594, filed on Aug. 9, 2012.

(51) Int. Cl.
| | |
|---|---|
| *H04L 29/06* | (2006.01) |
| *H04N 21/258* | (2011.01) |
| *H04N 21/41* | (2011.01) |
| *H04N 21/43* | (2011.01) |
| *H04N 21/439* | (2011.01) |
| *H04N 21/45* | (2011.01) |
| *H04N 21/462* | (2011.01) |
| *H04N 21/81* | (2011.01) |
| *H04W 4/18* | (2009.01) |

(56) References Cited

U.S. PATENT DOCUMENTS

2009/0204672 A1\* 8/2009 Jetha .................. G06Q 30/02
  709/204
2009/0254529 A1\* 10/2009 Goldentouch ........ G06F 17/241
2010/0030578 A1\* 2/2010 Siddique ........... G06Q 10/0637
  705/3
2010/0094878 A1\* 4/2010 Soroca .............. G06F 17/30035
  707/748
2012/0323687 A1\* 12/2012 Schuster ............... G06Q 30/02
  705/14.57
2013/0117123 A1 5/2013 Urbanski et al.
2013/0337838 A1\* 12/2013 Kolodziej .......... G06F 17/3087
  455/456.3

\* cited by examiner

METHOD AND APPARATUS FOR INTERACTIVE MOBILE OFFER SYSTEM USING TIME LOCATION FOR OUT-OF-HOME DISPLAY SCREENS

BACKGROUND OF THE INVENTION

Field of the Invention

The present invention is a method and apparatus for providing content to consumers through their mobile devices based on the consumers proximity to a display screen whose location is known to a server, the content being related to the images being displayed on the screen.

Description of the Prior Art

Display screens in retail stores, stadiums, amphitheaters, airports or other public places (out-of-home display screens) have and continue to gain increased popularity since their original introduction as a modern form of a poster, billboard or presentation medium. There are many reasons for their popularity and benefits over traditional media. They are available in different sizes and range extensively in features and capabilities. A simple system might be nothing more than a flat screen television display with a video signal that's received through the screen's integrated source input (Satellite, DVD, CCTV) or through integrated or add-on streaming media players. A more sophisticated system might have a much more advanced array of hardware and software.

In the current marketplace, it is often desirable to provide supplemental forms of advertising and information dissemination at the same point of presence where the digital signage is seen by consumers. Such advertising typically has been in the form of business cards, pamphlets, brochures, coupons registration forms, and similar items available at a nearby location.

In addition to physical materials, the modern version of a business card/brochure has been a web site. Thus, the content being shown on out-of-home display screens has been designed to present a web site address (URL). This required consumers to see and remember the address until they were able to take the time to visit it at a later point. This presented an issue, as relying on the consumer to remember the website and take the time to visit limits its usefulness. With the wide spread adoption of mobile devices, a new form of business card was developed—that being the QR Code and other similar optical codes that could be photographed using the built in camera on the mobile device. This would allow consumers to photograph the image of the code and then link to the associated website directly.

One of the benefits for out-of-home display screen programmers is that the format and technology gives the programmer unlimited canvas that can be updated and changed at anytime. The limitation then becomes the amount of time a consumer will see the screen and be able to ingest the content. Therefore any references to supplemental content (e.g. a web site or QR Code) must be able to be easily seen by the consumer and available for a long enough time so that they can utilize it. If the consumer is required to perform a task with the screen, this time must also be accounted for. This presents a major issue for screen programmers when the screen itself will only be seen for a short period of time or where there is a desire to have programming that moves at a faster pace through say a series of short visual ads.

Another limitation of supplemental content linking (e.g., a web site or QR Code) via out-of-home display screens has been sub-optimal physical limitations. An advertisement with a brand/logo may be easily seen from a distance, from various angles, or in passing. However this does not always work well with consumer flow in public spaces. Furthermore, there are social limits in how far a consumer will go to link to for example a QR Code that requires them to stand out, aim their camera with some level of accuracy and make one or more attempts to scan the QR Code using their mobile device camera. QR Codes become difficult to use because of the required position and re-positioning of the camera to capture the image in as still a manner as possible. Users must be within very close proximity and at the correct angle to the QR Code—within inches if the QR code is small and not presented in a full-screen manner on a larger screen. What was seen as a simple technology that would overcome the requirement of a consumer remembering a web site can be an exercise in frustration. If you add in the fact that the screen content may be changing at all times, the consumer may only have a short amount of time to scan the code before another visual is presented on the screen.

It is often a case of whether the consumer will have the time and inclination to carry out the different tasks to access the related content at that time or whether they will wait until they can do so at their leisure. This limits the use of any in-store or location based related materials such as special offers/coupons, etc.

"Audio fingerprinting" technology has also gained popularity. This technology uses the microphone on the mobile device to sample the audio being heard from a video display screen. It does an analysis and compares the audio sample against a database of known audio files. If it finds a match it is able to know where in an audio-visual presentation that segment was found. While this technology is quite suitable for in-home use and in quieter environments, it is largely impractical for use in public spaces or environments where noise levels are not fixed.

In addition to "Audio Fingerprinting", there is a secondary audio technology known as "Audio Watermarking"—that is the insertion of an audio signal into a audio-video presentation in a form that cannot be heard by the human ear, but can be sampled and analyzed by the mobile device microphone.

This technology has most of the limitations of audio fingerprinting also making it impractical in most situations for public use. However, the present invention does discuss its use in very specific ways to enhance but not limit the present technologies.

Programmers of out-of-home display screen content work with a large range of content including images (brand/logo images, product screens, photos/still advertisements) and video (animated branding/logos, video ads, etc.). They must produce this content in such a way so as to present well on screens of varying sizes. Each of the ads if separate from the previous one must be "marked up" to provide a visual link (QR Code or Web Address/URL) in a manner that can be seen and used by the consumer. For a 30 minute video with sixty 30-second clips, this requires a substantial amount of resource time just to prepare the linking content. Audio-fingerprinting and/or watermarking also have this requirement, but because of their limitations can only be used in very quiet locations.

Related content offerings provide no measurements in regards to gathering statistical information on the reach and value of a particular screen without multiplying production time of the video substantially. The content programmers would literally have to create and place different related links/QR Codes/audio-fingerprints for each segment on every different screen. Without this effort, there is no cost-effective way to answer questions such as:

How many people saw the digital signage?

What percentage of people saw the digital signage and accepted the supplemental materials?

Which advertisement was more attractive to and beneficial in relaying a message to the consumer based on the number of consumers that accepted it and carried through to a link?

While there are many benefits to using out-of-home display screens, it is clear that they have some clear limitations. The present invention overcomes many, if not all, of the limitations discussed above and further simplifies the process of linking consumers to content directly related to what they are seeing on an out-of-home display screen at any given moment. It does so in a manner that also provides full analytic capabilities on any individual screen's consumer reach/adoption and details based on the content that is displayed at any given moment.

BRIEF SUMMARY OF THE INVENTION

The invention enables content which is related to content being displayed on an out-of-home display screen to be fully synchronized with the video and static content that is being shown on the out-of-home display screen. Simply by pressing a button on a mobile device, or otherwise activating software on the device, relevant and targeted offer transfers based on content being shown on the out-of-home display screen is provided to the mobile device via a server. No Wi-Fi or Bluetooth connection is needed. The user only needs a data connection to a wireless carrier such as Verizon®, AT&T®, T-Mobile®, etc.

The system presented can work alone without any communication between the mobile device and display screens wherever located; it is based on a mobile device to server communication of the mobile device location and the time of day. Based on the time and communicated location, the server can determine what content is on the display screen and can therefore serve synchronized offers. It works passively with periodic regular updates of the mobile device location or actively through the use of a button (touch screen, keyboard, etc.) on the mobile device to signal the server to check its location and therefore identifying which display screen the mobile device is near.

The uniqueness of the technology relies on proximity and time of day to completely synchronize the content on display screens with mobile devices and enables sharing and syncing of content on the out-of-home display screens which include, by way of example, TV sets, ATM machines, display screens in retail stores, stadiums, amphitheaters, airports or other public places without the need of a Wi-Fi, or Bluetooth connection, and only a simple data connection to a wireless carrier. Such display screens may or may not be digital and may or may not be able to transmit data to another device such as a server. Display screens with communications ability enable additional features of the invention to be utilized, but such communications ability is not required in many situations.

There are several different implementations and embodiments for the present invention, however at a minimum level it provides a method and apparatus allowing for the determination of a consumer's proximity to a particular out-of-home display screen. Furthermore it can determine the content being shown on each and every out-of-home display screen in the system so that it can then deliver to the consumer related content on their mobile device. It does this in a manner that is extremely simple and can be accomplished passively or actively.

The following examples show several uses of the technology. They are by no means all encompassing and are presented to illustrate some of the possible uses. In all cases, a consumer downloads a software application for the mobile device designed to transmit the present location of the mobile device and send/receive content from a server. The application can be a generic application which works with substantially all display screens which are part of the network connected to the server, or a specialized application, e.g., a travel app, specifically tailored to display screens in certain location, e.g., airports.

Example 1

Retail Store

Seamless transfer of digital assets from device to device without the need for additional hardware, Wi-Fi connectivity or Bluetooth.

Key components of the technology include the ability to transfer digital media, which include the following: digital currency, digital coupons, digital advertising, digital songs, digital books, digital video clips, and any and all forms of digital files. It is unique in that it needs no additional hardware to transfer any of the above listed digital assets between the following devices:

From a TV set to mobile phone

From an ATM machine to a mobile phone;

From an out-of-home display screen in a store, stadium or amphitheater to a mobile phone;

From a display screen in an airport to a mobile phone;

What makes the technology so empowering is its simplicity, its value and its relevancy in an exploding market.

For example, a consumer walking through a large department store with a mobile device, which has the above-described software can interact with an out-of-home display screen. At select locations within a department, the retailer/service provider has placed display screens to provide video advertising of products, providing information and marketing content.

As the consumer passes by the screens, the consumer is offered related content on their mobile device. One offer may be a coupon or special offer for the product they viewed on the display screen, which they can then claim at the point of purchase. Consumers must opt-in to receive additional offers (pushed from the retailer) at any point in the future. These offers can be directly related to the content they saw on the screen, or cross-marketed towards them based on their interests, stores/departments they frequent, etc.

In one variation of the above—the mobile device prompts the user simply by notifying them that there is supplemental content. The user can then request (pull) content related content (perhaps selecting specific information/content).

In another variation of the above—the content server acknowledges the user's location and the content on the screens by "pushing" related content to the users mobile device.

Example 2

Medical Waiting Room

A consumer in a waiting room at a medical office is watching an "information video" regarding healthy living. During the video there is a short segment on diet and health, several types of food are shown and a meal is prepared.

As the consumer watches, an offer for a recipe and nutritional information is offered. To accept it, a button (hard or soft) on a mobile device is pressed and the content is pulled from the server to the mobile device. The content is specific and exact in terms of its relationship to the content that they are watching on the video screen in front of them.

In another variation of the above, the user can actively choose to take part in all content—thereby allowing the server to selectively push content related to that which is on the out-of-home display screen. One example might be a simple survey regarding nutrition or physical fitness.

In all circumstances, the user may have the option of receiving future related content either through push and/or pull requests.

Example 3

Gas Station

A consumer is pumping gas and watching an on-screen video at the pump. There is an offer being made during the video for a discount on an oil change at a nationwide lube shop.

The consumer is able to get the discount coupon via their mobile device. By linking the promotional offer to the location where it was actually received, a "kick-back" is provided to the gas station where the video offer was viewed and accepted.

In one variation of the above, the user may have opted-in for content from that gas station provider. Any time the user is at the gas station, their application comes alive based on the location. As it is common for gas stations to prohibit mobile use at the pumps, the application could present related content as an offering upon leaving the station.

Example 4

Supermarket

While shopping at a local supermarket, the consumer comes to an end-cap display with a video screen for a major cola brand. As they reach it and view the ad, a notification is sent to their mobile device offering them a coupon offering Buy-One-Get-One Free.

They can accept it with a simple touch and are then able to carry out the purchase of the product and present the coupon on their mobile device for scanning at the cash register.

In a separate variation of this scenario, the content on the video screen is a person cooking a meal made up of several products. The consumer can then actively request the list of ingredients and recipe instructions to be sent to their device, forwarded to a friend, etc.

Example 5

Airport

While on a moving walkway at a major airport, the user approaches a set of screens that are displaying advertisements for a major airline loyalty program. The display encourages users to sign-up for instant rewards.

The mobile device offers an interactive "sign-up" form, they can choose to accept it, save it and fill out the input fields when they have a moment in the future. By carrying through with the completion of the form they are registered for the program.

Example 6

Train Station Lobby

While sitting in a lobby of a train station, the consumer is watching a newscast aimed at travelers. It covers late breaking news national/local news and travel/destination information.

As each of the news or special interest stories comes up, a "Follow This" link is made available via the consumer's mobile device. By accepting the link they are able to access additional content via the news providers web site on that particular story/coverage. This might also trigger the application to continue offering new updates as the story develops and/or changes.

Example 7

Home Use

After downloading the application as in the prior examples, the mobile user can make use of the application on out-of-home display screens. However, upon determining that the user is not presently at a location where there is an out-of-home display screen, the software on the server can deduce that the user is activating it from a non-controlled screen location. At this point, secondary content determinations including audio fingerprinting and/or audio watermarking can be utilized. In these cases, the audio signal produced by the audio-visual signal received by the display screen can be analyzed and matched according to well known techniques. An example here is that one watermark might be provided for a specific client/brand. Additional watermarks can be assigned to specific product ads.

All of the above use examples utilize a combination of the location of the video screen, the location of the consumer (proximity to screen), and the content being displayed on the display screen at any moment in time. It is the correlation of location and the timeline that allows for the system to deliver to the consumer relevant supplemental content to their mobile device.

All of the above use examples could be possibly be carried out using present technologies (QR codes, etc.) if practical. However, because of those technologies' limitations, adoption by screen programmers/owners or consumers cannot span across diverse physical environments. Because of the greatly simplified consumer experience, the present invention makes developing content easier for producers/owners and adoption easier for consumers across environments.

The present invention differs from other technologies in the following ways:

1) It requires very little intervention on the part of the consumer. The system automatically handles all aspects of determining both the correct location of the screen, location of the consumer and correct content (exact time in the video stream) being played on the display screen.

2) It can utilize a single video stream for multiple locations without the need to customize each video or overlay on a per location basis. This greatly reduces the work related to preparing and distributing the video content.

3) It does not require any of the screen area to present code/web addresses, etc.—Therefore it allows the producers of the content to use 100% of the screen area for the programming. The activation button can be a soft button displayed on a mobile device screen for brief amounts of time, providing recognition by consumers that there is "enabled" content available for their mobile device. In the same respect, the mobile device can "wake up" based on the presence of "interactive" screens being available. The wake-up is a push notification, allowing the user to bring the application into the foreground. This contributes to a cost reduction as the locations do not require larger screens capable of displaying both the video content and the on-screen codes in a manner that is readable by consumers.

4) No need to take pictures of QR code or be within close physical proximity to a display.

5) No Wi-Fi, Bluetooth or infrared, just data connection to wireless carrier.

The technology presented can work alone without any communication between the mobile device and display screens at any location; it is based on the mobile device to server communication of the mobile device location, the location of the display screen and the time of day. Based on the time and location, the server determines what content is on the display screen and can therefore serve synchronized offers. It works passively with periodic regular updates of the mobile device location or actively through the use of a button (touch screen, keyboard, etc.) on the mobile device to signal the server to check its location and therefore identifying which display screen the mobile is near.

Furthermore, the technology can also work in co-operation with audio watermarking to signal a location update to occur. In this manner, an audio watermark is repeated throughout the video programming. Its purpose is solely as a trigger—signaling the device receiving the audio to send its present location to the server. It is essentially a passive "get related content" button that only the mobile device can receive. The signal is the same on all screens and in all video content. As the business and marketing models will vary, different clients and/or stores may have specific audio watermarking applied. Therefore, one store's "application" might wake up based on it identifying a store/brand specific watermark. In another version of the software, it might work with multiple watermarks, allowing it to switch from store to store.

The technology presented can utilize a variety of technologies to determine its present longitude and latitude as available on the specific mobile device. These include Global Positioning Satellite (GPS), cellular towers (using triangulation), etc. The only requirement is that the device can send either passively or actively its coordinates (longitude and latitude) to the service.

DETAILED DESCRIPTION OF THE INVENTION

Figure 1:
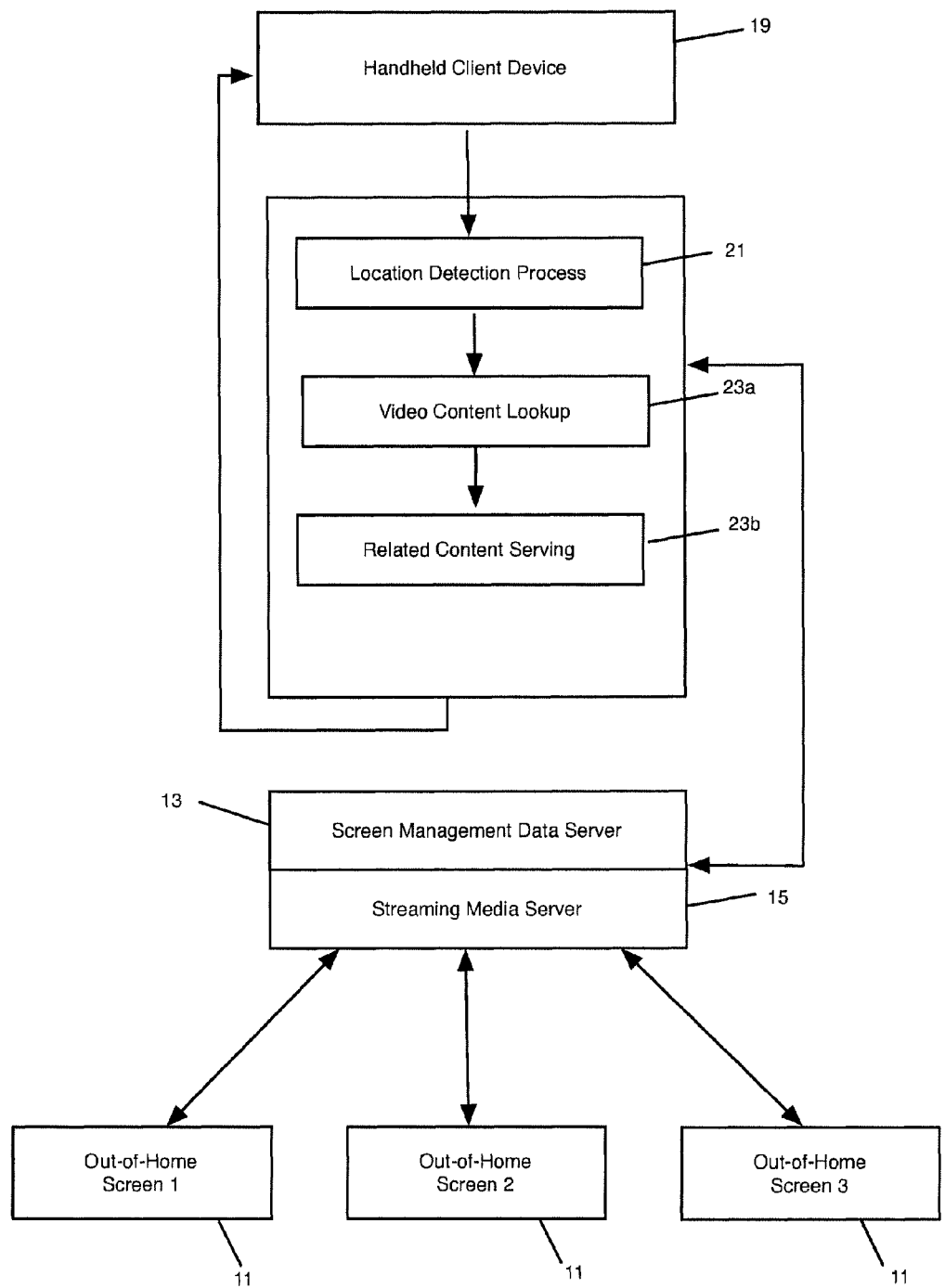
FIG. 1 is a block diagram showing the elements of the invention and data flow.

The present invention makes use of the following elements shown in FIG. 1:

Out-of-Home Display Screens 11

These are referred throughout as out-of-home display screens, digital signage, and primary screens or display screens. The minimum requirement is that these devices be capable of receiving an audio-video feed by way of a streaming server. In most cases, the streaming server is a remote device and the video feed is provided over a network. However, in some situations, where the stream is in the nature of a video loop, the streaming device can be a local DVD player or the like.

Screen Management Data Server 13

One or more management servers contain information on the location of each and every display device in the system. This information can be updated manually by an operator or in an automated manner as is described and detailed in the various implementations.

Streaming Media Server 15

The use of one or more media servers provide out-of-home display screens with access to pre-recorded and/or live video streams made available by the operator. The use of streaming video content is presently in wide use. Although many of the implementations and examples explicitly refer to video, the video content can contain motion video, animations, slideshows, still images, or a combination of any audio or visual content that is capable of being viewed on one or more out-of-home display screens.

Mobile Device 19

These presently include mobile smart phones, tablets, and other electronic devices capable of data communications, receiving and displaying information for the consumer from a remote server, and transmitting user input to a remote server. In addition, these devices must be able to provide geographical location of the device is real-time.

Location Detection Processing Server 21

A variety of location services are in wide use in software and via the Internet at this point in time. These services provide software API's and "Web Services" for effectively locating a position anywhere on earth using longitude and latitude coordinates. It is a common practice to perform calculation of distances between two sets of co-ordinates to determine proximity to another location or object. Location detection processing server 21 utilizes location information provided by a mobile device's use of such location services.

Video Content Lookup Server 23a and Related Content Processing 23b

Related content can be any form of data that can be sent to and processed by a mobile device for either direct use/display/playback, storage, or further consumer interaction. There are references throughout the different embodiments that refer to coupons, forms, images, offers, and interactive content. Any and all of this content is relevant and related to the streaming video content being displayed on one or more out-of-home display screens at any time.

Implementation Details

Display Service—One or more streaming media servers 15 connected to a private or public communications network provide access to data related to the location of individual display screens 11. The information contained within the data tables on server 15 includes at a minimum the following details:

Display ID—A unique identifier for a display screen 11.

Longitude—A numeric value related to a specific longitude of each display screen.

Latitude—A numeric value related to a specific latitude of each display screen.

Last Start Time—A time value representing the last time the video being display was started on the streaming data server 15

Video Content ID—Details on video content including time code and identification codes related to specific content available from a content server 23b.

When a display screen 11 is turned on, it communicates with streaming media server 15 sending it a request for a specific video content ID as programmed by the operator.

Upon receiving the request, the server 15 begins to stream the requested video content to the display screen 11. At the beginning of the stream initialization, server 15 sets the "Last Start Time" in a screen location data table located on server 15 as the present time on the server.

Related Content Service—One or more related content servers 23b connected to a private or public communications network provide access to a content data related to one or more video programs which are identified by a specific content ID which is unique for each video stream. The information contained within the data tables on related content server 23b includes at a minimum the following details:

Display ID—This directly corresponds with the identification of a specific out-of-home display screen.

Content ID—An identification of the video content being shown on the display.

Time(s)—One or more times (specific time(s)/date(s) or time/date range(s) for the video content being shown on the display Related Data—The content from related content server 23b to be served to the mobile device 19.

The streaming video server 15 and related content server 23b may be separate physical servers or contained on a single physical server. In all cases, the data that is available on server 15 and on server 23b is shared and accessible by both servers.

Location Detection Process—One or more location detection process servers 21 connected to a private or public data communications network provide the ability to determine the nearest location of an out-of-home display screen 11 based on a given longitude and latitude of a mobile device.

Mobile devices 19 include any device which is capable of
a) sending its present longitude/latitude,
b) communicating with remote servers via communications networks.
c) sending requests to a remote server.
d) receiving and displaying data/information received from a remote server.

Each such device contains a client application capable of processing data specific to the application and utilizes the capabilities of the specific device. The specifics of such application are not important to an understanding of the invention and the requirements to write code for such applications are well within the abilities of persons skilled in the art based on the descriptions provided herein.

Each mobile device 19 has a unique client ID and uses an existing location service such as GPS or WiFi triangulation to determine its current latitude/longitude. The ID and location are the minimum required information needed to be provided by each mobile device. The ID represents the individual mobile device, the longitude and latitude represent its present location. As the mobile client changes locations, its longitude/latitude are updated and sent to location detection process 21.

At the point where the mobile device 19 requests synchronization with a particular display screen 11, it sends its client ID and its present location (longitude/latitude coordinates) to location detection process 21.

Upon receiving a request, location detection process 21 calculates the distance between the mobile device 19 and the nearest location of known operating display screen 11. If one is within range of the mobile device 19, video content lookup 23a performs an additional lookup of related data on related content server 23b. The range can vary based on screen size, location and other factors.

At any point where a mobile device 19 has made a synchronization request with location detection process server 21 and the server has determined the nearest display screen 11, server 21 performs a lookup using video content lookup server 23a. The video content lookup server 23a and related content server 23b may be on the same physical server or on a separate server. In either case the information from both servers is available to the screen management data server 15 which may also be part of the same server or a separate server.

Using the display ID identified as the nearest display screen location, the screen management data server 13 looks up the video content ID and Last Start Time which corresponds to the stream being played and the time on the server 15 when the display screen 11 first began playing the video stream.

The screen management data server 13 performs a calculation using the present time and subtracting the start time to determine the time difference.

Using the above data, screen management data server 13 can now perform a lookup of related content for the specific video stream ID and a timecode matching the present time in the video by using the display ID, video ID, and video stream timecode as the key to related data in display screen 11.

The returned data is sent from related content server 23b and corresponds to the specified time, video stream, and display screen based on the initiating request from screen management data server 13. This data can be any related data and is not of a defined type.

It is important to note that a single video stream can have content that is unique to each specific display screen location allowing for localization of offers and content.

Display screens 11 are devices capable of displaying/presenting video contained on one or more of the following sources—a video stream delivered via a private or public network, a physical (fixed or removable) media device. Display screens may be capable of sending and receiving instructions and information from the display service as described above. Specifically, through these instructions, the display service knows what content is being displayed on the device at any time.

Users of the present invention use a mobile device 19 with a suitable "client application" (software program). The client application sends its location (longitude and latitude) to the location detection process server 21. This can be done by one or more of the following methods:

a) The mobile device, via the client application, can periodically send the location of device.

b) The user can interact with the client application and request that the application send its present location.

The location detection process server 21 determines the approximate distance of the mobile device from the location of display devices 11. Based on the location of the nearest display device, the service determines whether it is possible for the user to be within viewing range of the display.

If it is determined that the possibility exists for the user to be in viewing range of the display, the client application is provided with related content from the related content server 23b specific to the content presently viewable on the display device 11 in the viewing range of the user. The related content can include of one or more audio, video, images, or text.

The client application uses its internal programming to present the related content to the user. The content is unlimited, however it might include additional related videos, music/audio files, animations, photos, bar-codes, coupons, maps, etc. It is however, directly related to the time and location of the display device 11 that was originally viewed.

The client application can further process the received content based on the type of content and interaction with the user. Examples at this point in the process might include storing the content for future use, accessing a deeper level of content pertaining to the related content, sharing the content with others, sending the content to another device (e.g. a printer), etc.

Servers 21, 23a, 23b, 13 and 15 can be operated from a single physical server, be spread among multiple physical servers, or may reside on a cloud-based computing service. The data the servers access and use in processing requests may be contained on the same server in a machine readable format or can be stored on separate database server.

Strategically placed display screens 11 present video and still imagery at predefined times. As noted above, each display device has a unique identifier and can present content which is unique to that location or identical to that which is displayed on other display devices in multiple locations.

The following embodiments are examples of how the invented system may be used. Such embodiments and descriptions are intended to be illustrative and the invention is not limited to these embodiments.

Embodiment 1

Simple IPTV

In this embodiment of the present invention screen management server 13 contains information about out-of-home display screen 11 locations. A data table contains a record for each out-of-home display screen.

Example Out-of-Home Display Table:

| Display ID | Video ID | Latitude | Longitude | Start Time |
|---|---|---|---|---|
| 1 | 4 | 45.016542 | −76.364014 | 01-01-2013 10:05:13 |
| 2 | 27 | 45.01822 | −76.364000 | 01-01-2013 10:25:27 |

Display ID A unique ID assigned to a specific display.
Video ID The ID of the video presently being shown on this screen.
Latitude and Longitude The Geo-Location Coordinates of this screen.
Start Time The last time this video was started.

The system determines the longitude/latitude of the screen when positioning it and enters this into the out-of-home display screen table above through a software application on the screen management server 13.

The out-of-home display screens used are a digital sign incorporating a simple IPTV ("Smart TV") device capable of having its video source set to a URL (Uniform Resource Location) of a streaming video located on a private or public communications network that utilizes TCP/IP.

The display screen is set up in a location visible to consumers. The system uses screen management data server 13 to select what video feed from media server 15 to play on this particular screen. This can be changed at any time.

Any time the screen is turned on, its "source" input is configured to access streaming video content from media server 15 via a specified URL.

Example URL: rtsp://video.xyzdomain.com/1/

In the example URL, the media server 15 is located at the address:

video.xyzdomain.com

A software application residing on the media server parses the provided URL which contains /1/. It parses this portion of the URL and uses it as the display ID variable.

Upon receiving the URL request and parsing the contained display ID the media server performs two tasks:

a) It starts streaming the video listed in the table from media server 15 to the out-of-home display screen that made the initial request as determined by the display ID.

b) It updates the data table contained on the screen management server 13, setting the start-time to the time that the video began streaming to the out-of-home display screen.

At this point the out-of-home display screen is playing the video and the server 13 knows the time that the video first started playing.

Every video stream (pre-recorded or a live-mix feed) available for streaming to out-of-home displays has a related content data table. This data is maintained by operators/publishers who add one or more records identifying content to be made available to consumers on their mobile device when in proximity to a particular screen.

Example Content Table:

| Video ID | Display ID | Start Time | End Time | Content ID |
|---|---|---|---|---|
| 4 | 1 | 00:00:01 | 00:00:45 | 3392 |
| 4 | 34 | 00:00:01 | 00:00:45 | 3422 |
| 4 | * | 00:00:46 | 00:01:15 | 2068 |
| 4 | * | 00:01:16 | 00:02:16 | 4833 |

Video ID/Display ID - These two variables allow for unique content to be made available or individual screens or across all screens. The "*" indicated in the above table denotes that the content should be played on all screens for Video 4.
Start Time/End-Time - Denotes the time within the video timeline that this particular content should be made available to mobile devices.
Content ID - Identifies the particular content to be made available.

Additional information may also be contained in the content table; the above illustrates the primary fields needed.

As consumers pass by out-of-home display screens located at various locations that are tracked by the screen management data server 13, they watch the videos presented on these screens and if they have a mobile device 19 can interact with the content—either passively or actively.

In this embodiment, the consumer presses a button on mobile device 19 which signals the software application running on the device to update its present longitude/latitude with the location service 21 responsible for calculating the distance between the consumer and the out-of-home display screens managed by the screen management data server 13.

It is important to note that while this embodiment requires the user to press a button on the mobile device to update their location with the screen management data server 13, this and other embodiments can use any of following methods to update their location:

a) A user presses the button, signaling the software on the mobile phone to send its latitude/longitude to location detection process server 21.

b) The software on the mobile device is configured to periodically send the latitude/longitude to screen management data server 13 at specified time intervals (e.g. every 30 seconds).

c) The software on the mobile device is configured to sample environmental audio, listening for a specific audio cue ("watermark"). Upon hearing that audio it sends its longitude/latitude to screen management data server 13.

The method chosen would be based on the planned environment and those designing the particular mobile application user experience.

It is also important to note that the longitude and latitude may be by any means available to the device. The present means include Global Positioning Satellites (GPS), Cellular Tower Locator Servers, and Wi-Fi Triangulation. As this area of technology is rapidly advancing, mobile devices can and will use a variety of different means to get their location. New technologies are of benefit in that they provide better reach (e.g. they can be used in more places and with less interruption due to environmental conditions) and they can provide increased accuracy (e.g. within 9 feet vs. 50 feet). In all cases—it is the ability to send longitude and latitude of the mobile device that enables the other system elements to send the appropriate related content to the mobile device.

Upon receiving longitude/latitude coordinates from a mobile device 19, the location detection process server 21 evaluates whether the location of the consumer is within a given proximity to any of the out-of-home display screens that it knows as provided by screen management data server 13. If location detection process server 21 determines that the consumer is within a set proximity, screen management data server 13 will then determine what related content is available on a particular screen 11 at the present time.

Embodiment 2

Sophisticated Out-of-Home Display Screen

In this embodiment, the out-of-home display screen 11 is an intelligent device that is equipped with a screen that uses an integrated or add-on device capable of both playing video delivered via an IP stream and also providing its present longitude/latitude.

The screen owner would position it into their chosen public/private location and turn the unit on. When each display screen system 11 initializes it carries out three things:

1) It connects to the screen management data server 13 and notifies the server of its screen ID and that it is available.

2) It sends to the screen management data server 13 its longitude/latitude coordinates.

3) It requests video content, which is sent to it from the streaming media server 15.

In this embodiment, screen locations can be automatically updated. Therefore movement of the screen physically does not require the operator to set the longitude/latitude of the screen manually. All other aspects of the screen and its usage are the same as in the first embodiment.

Embodiment 3

Highly Active Screen Area

In this embodiment, many screens are located throughout a facility.

As the consumer moves through the facility, the location is updated frequently based on the location of the mobile device 19 and sent to location detection process server 21.

Servers 13, 21, 23a and 23b coordinate the experience for the user based on their direction/flow and the screens they are engaged with.

As they approach various screens, related content offers are presented to the user on their mobile device. They may choose to accept them or do nothing and let them pass. Depending on the software application, the user may be given the option to review offers that were made to them at an earlier point in their journey as they passed by the various screens.

Embodiment 4

Multiple Screens with Wi-Fi Triangulation

In this embodiment, screens are located throughout a facility. Consumers connect through a series of localized Wi-Fi access points which triangulate their location in relation to specific longitude/latitude co-ordinates throughout the facility.

1. Each of the out-of-home display screens connects in a manner similar to or the same as Embodiment 1, 2 and 3.

2. Consumers are asked to accept and use a free Wi-Fi communications connection to their mobile device during their visit to the facility.

3. The mobile application is programmed to communicate with a local server that is also connected to the Wi-Fi access points. The local server is able to determine relative signal strength from the different units. As they are passed from one access point to another, their distance is determined from the out-of-home display screens based on triangulation.

4. If they are within a given proximity based on the triangulation, their location is updated on the server and related content is then pushed to their device.

Multiple Time Identification Options

In the simplest form, the actual stream time is provided by the streaming media server 15 is based on what is being sent to a display 11 at any particular time. E.g.—The present video is a retail loop, 3 minutes and 30 seconds into a video that lasts 6 minutes. There are several video-streaming servers that provide an interface into the time index by external software, such as the related content server 23b, which is used to deliver content to the mobile device.

In another version, the time is based on the initial request for video from the display unit 11 (one that pulls a video stream). When it first makes the request for the video, the streaming media server 15 records the time that it first started sending the video. For example, assume the time is 3:20 p.m. when the request for a stream was made, and the video stream being sent is a 30-minute stream, which will loop indefinitely until the display device initiates a shutdown. If at 4:30 p.m. a mobile device signals a location that is within proximity of the screen, the screen management data server 15 performs a calculation determining the number of minutes since the stream started (in this case it is 1 hour and 10 minutes). It makes a second calculation to determine by division the number of loop cycles that have occurred within the given time (in this case, it would determine that it is in the $3^{rd}$ loop). The final calculation would determine that it is 10 minutes into the present loop and therefore return content corresponding to that time.

In another version, the screen management data server 13 pulls the time from the video based on a request from a nearby mobile device 19. The mobile device sends its location to the server 13; the server then polls the nearest display screen to get the current video time.

All of these variations provide a method for determining the time of the video. Software and data contained on server 13 are able to correlate actual content being displayed based on time and screen location, and use this information along with information obtained from location detection process server 21 and video content lookup server 23a to enable related content server 23b to send content related to that being displayed on a display screen 11 to a particular mobile device 19 based on the relative locations of the two devices.

Servers 13, 15, 21, 23a, and 23b may be implemented using one or more computers or similar devices configured to function as described herein. Similarly, mobile devices and display screens suitable for use with the invented system are readily available from a wide variety of sources. As noted above, although such mobile devices, and in some embodiments, the display screens would need to be programmed to be able to interface with the invented system, such programming is well within the abilities of those skilled in the art based upon the descriptions provided herein.

Figure 2:
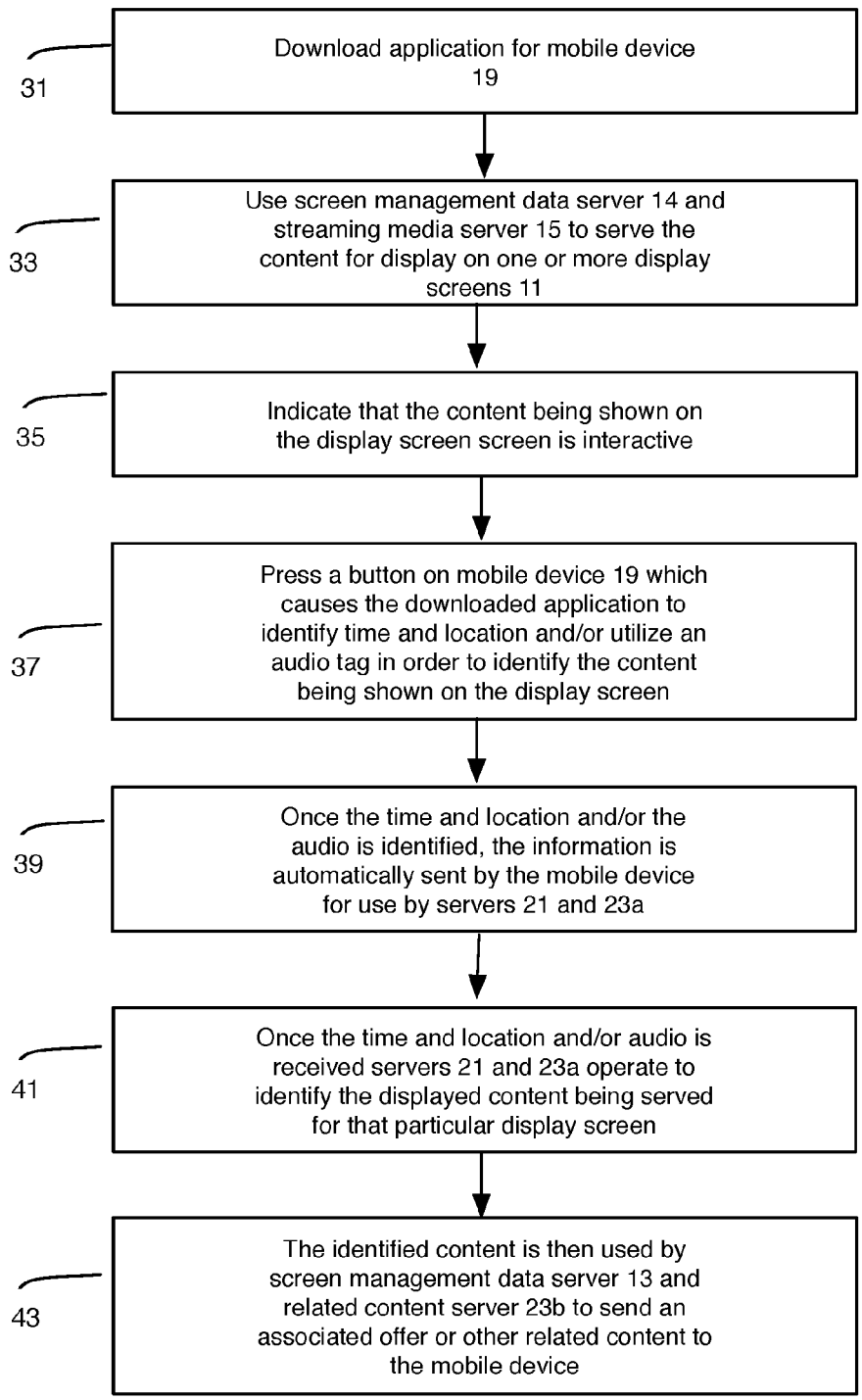
FIG. 2 is a flow diagram showing the various steps utilized to practice the invention in one embodiment.

Referring now to FIG. 2, the following steps may be utilized to practice the invention as described herein. Initially, an application is downloaded 31 for mobile device 19, which application is designed to perform the mobile device processing described herein. As noted above, such program although used by the invention does not form a part thereof, and is easily implemented by persons having ordinary skill in the art based on the descriptions provided herein.

Screen management data server 13 and streaming media server 15 are used 33 to serve the content for display on one or more display screens 11. Preferably, there is an indication 35 that the content being shown on the display screen is interactive so as to signal a user with a mobile device that additional information can be downloaded. Such indication may be a logo placed in a corner of the screen or the like.

Pressing 37 a button (soft or hard) on mobile device 19 causes the downloaded application to identify time and location and/or utilize an audio tag in order to identify the content being shown on the display screen. Alternatively, the signal could be sent by shaking or otherwise moving the mobile device using motion sensor devices built into the mobile device.

Once the time and location and/or the audio is identified, the information is automatically sent 39 by the mobile device for use by servers 21 and 23a.

Once the time and location and/or audio is received 41, servers 21 and 23a operate to identify the displayed content being served for that particular display screen.

The identified content is then used by screen management data server 13 and related content server 23b to send 43 an associated offer or other related content to the mobile device All the processes and logic flows described can be performed by one or more computers having programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for executing instructions and one or more memory devices for storing instructions to be executed and data used by the instructions being executed. In different embodiments, the servers implemented using such computer systems may be any of various types of devices, including, but not limited to a personal computer system, desktop computer, laptop, notebook, or netbook computer, mainframe computer system, handheld computer, workstation, network computer, application server, that is, in general, any type of computing or electronic device. Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), or the like. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. The specifics of such computer systems are not important to an understanding of the invention and such systems are readily available from a wide variety of sources as is well known in the art. Further, although the specific functionality as described herein in is required to implement the invention, persons skilled in the art can easily configure such general purpose computers or similar devices using well known techniques to implement such functionality by following the explanations contained herein.

I claim:

1. A system for enabling desired content related to content being displayed on at least one display screen to be sent to a mobile device comprising:
   a) a location detection process server configured to receive current location information from said mobile device and determine a location of a nearest one of said at least one display screens, and determine whether the mobile device is within a predetermined range from said determined location;
   b) a display content lookup server coupled to said location detection process server configured to determine if predetermined content exists which corresponds to content being displayed on a display screen at said determined location and said mobile device is determined to be within said predetermined range;
   c) a screen management data server configured to operate in coordination with said location detection process server, said display content lookup server, and a related content server to cause said related content server to send data to said mobile device which is related to content being displayed on said display screen at said determined location if said mobile device is determined to be within said predetermined range.

2. The system defined by claim 1 wherein said location detection process server determines the location of the nearest one of said at least one display screens by accessing a data table maintained by said screen management data server which contains a display identifier and a latitude and longitude for each of said at least one display screens.

3. The system defined by claim 1 wherein said display content lookup server and said screen management data server operate to determine if said related content server includes data which is related to said content being displayed on said display screen at said determined location using a display ID corresponding to said display screen, and a content ID corresponding to said content being displayed on said display screen.

4. The system defined by claim 1 wherein said related content is provided to said mobile device by one of said mobile device initiating a request for said related data by a pulling operation and said related data being pushed to said mobile device without a specific request being initiated by said mobile device.

5. The system defined by claim 1 wherein upon determining that said mobile device is outside said predetermined range, said screen management data server is configured to send a signal to said mobile device to sample an audio signal to identify said content being displayed and send said identified content to said screen management data server which is further configured to operate in cooperation with said related content server to cause said related content server to send data to said mobile device which is related to content being displayed on said display screen as determined by said sampled audio signal.

6. A method for providing content to a mobile device which is related to content on a display screen comprising:
   a) determining a location and content being displayed on the display screen;
   b) determining a location of the mobile device by receiving location information from said mobile device;
   c) if said determined display screen location and mobile device location are within a predetermined distance of each other, sending content to said mobile device which is related to content being displayed on said display screen.

7. The method defined by claim 6 wherein said determining a location and content being displayed comprises accessing a data table which contains a display identifier and latitude and longitude for said display screen.

8. A method for enabling desired content related to content being displayed on at least one display screen to be sent to a mobile device comprising:
   a) receiving current location information from said mobile device;
   b) determining a location of a nearest one of said at least one display screens;
   c) determining whether the mobile device is within a predetermined range from said determined location;
   d) determining if predetermined content exists which corresponds to content being displayed on a display screen at said determined location;
   e) sending data to said mobile device which is related to said content being displayed on said display screen at said determined location if said mobile device is determined to be within said predetermined range.

9. The method defined by claim 8 wherein said determining if predetermined content exists which corresponds to content being displayed on said display screen at said determined location comprises using a display ID corresponding to said display screen.

10. The method defined by claim 8 wherein said sending data to said mobile device comprises one of said mobile device initiating a request for said related data by a pulling operation and pushing data to said mobile device without a specific request being initiated by said mobile device.

11. The method defined by claim 8 wherein upon determining that said mobile device is outside said predetermined range, said method further comprises:
   sending a signal to said mobile device to sample an audio signal to identify said displayed content;
   receiving from said mobile device said identified displayed content; and
   sending data to said mobile device which is related to content being displayed on said display screen at said determined location as determined by said sampled audio signal.

12. A system for enabling desired content related to content being displayed on at least one display screen to be sent to a mobile device comprising:
   a) a location detection process server configured to receive current location information from said mobile device and determine a location of a nearest one of said at least one display screens, and determine whether the mobile device is within a predetermined range from said determined location;
   b) a video content lookup server coupled to said location detection process server configured to determine if predetermined content exists which corresponds to content being displayed on a display screen at said determined location and said mobile device is determined to be within said predetermined range;
   c) a screen management data server configured to operate in coordination with said location detection process server, said video content lookup server, a related content server and a streaming media server to cause said related content server to send data to said mobile device which is related to content from said streaming media server being displayed on said display screen at said determined location if said mobile device is determined to be within said predetermined range,
   wherein said video content lookup server and said screen management data server operate to determine if said related content server includes data which is related to said content being streamed to said display screen at said determined location using a display ID corresponding to said display screen, a content ID corresponding to said content being streamed and a last start time corresponding to a time when said display screen first began playing said content being streamed to said display screen.

13. The system defined by claim 12 wherein said screen management data server further operates to perform a lookup of related content for a video stream corresponding to a video ID and a timecode matching the present time in the corresponding video stream by using the display ID, video ID, and a video stream timecode.

14. The system defined by claim 13 wherein said screen management data server further operates to instruct said related content server to send said related content data to said mobile device determined to be within said predetermined range using a related content table having records wherein for each video ID, there is a corresponding display ID and for each start time and end time segment within said video stream there is a corresponding related content ID.

15. A method for enabling desired content related to content being displayed on at least one display screen to be sent to a mobile device comprising:
   a) streaming content to said at least one display screen;
   b) receiving current location information from said mobile device;
   c) determining a location of a nearest one of said at least one display screens;
   d) determining whether the mobile device is within a predetermined range from said determined location;
   e) determining if predetermined content exists which corresponds to content being displayed on a display screen at said determined location;
   f) sending data to said mobile device which is related to said streaming content being displayed on said display screen at said determined location if said mobile device is determined to be within said predetermined range
   wherein said determining if predetermined content exists which corresponds to content being displayed on a display screen comprises using a display ID corresponding to said display screen, a video ID corresponding to said content being streamed and a last start time corresponding to a time when said display screen at said determined location first began playing said content being streamed to said display screen at said determined location.

16. The method defined by claim 15 wherein said sending data comprises performing a lookup of related content for a video stream corresponding to the video ID and a timecode matching the present time in the corresponding video stream by using the display ID, video ID, and a video stream timecode.

17. The method defined by claim 16 further comprising sending said related content data to said mobile device determined to be within said predetermined range using a related content table having records wherein for each video ID, there is a corresponding display ID and for each start time and end time segment within said video stream there is a corresponding related content ID.

* * * * *